US012031952B1

(12) United States Patent
Liu et al.

(10) Patent No.: US 12,031,952 B1
(45) Date of Patent: Jul. 9, 2024

(54) EVALUATION METHOD FOR CREEP PROPERTY OF LUHPC

(71) Applicant: Wuhan University of Technology, Wuhan (CN)

(72) Inventors: Muyu Liu, Wuhan (CN); Zhifang Lu, Wuhan (CN); Qiang Zhang, Wuhan (CN); Zhou Jiang, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 18/501,452

(22) Filed: Nov. 3, 2023

(30) Foreign Application Priority Data

Feb. 14, 2023 (CN) .......................... 202310109290.2

(51) Int. Cl.
*G01N 3/08* (2006.01)
(52) U.S. Cl.
CPC ....... *G01N 3/08* (2013.01); *G01N 2203/0019* (2013.01); *G01N 2203/0071* (2013.01); *G01N 2203/0218* (2013.01)
(58) Field of Classification Search
CPC ........ G06F 30/367; G01N 3/00; G01N 21/45; G01N 3/18; G01N 3/08; G01N 17/00; G01N 3/32; G01N 1/28; G01N 25/48; G01N 29/07; G01N 33/383; G01N 3/60; G01N 11/00; G01N 19/10; G01N 5/04; G01N 25/20; G01L 25/00; C04B 16/0625; C04B 28/04; G01Q 10/065
See application file for complete search history.

(56) References Cited

U.S. PATENT DOCUMENTS 6,029,526 A * 2/2000 Feldman .............. G01N 33/383
73/803

OTHER PUBLICATIONS

CNIPA, Notification of First Office Action for CN202310109290.2, Apr. 28, 2023.
Wuhan University of Technology (Applicant), Reply to Notification of First Office Action for CN202310109290.2, w/(allowed) replacement claims, May 26, 2023.
CNIPA, Notification to grant patent right for invention in CN202310109290.2, Jun. 1, 2023.

* cited by examiner

*Primary Examiner* — Brandi N Hopkins
(74) *Attorney, Agent, or Firm* — Zhigang Ma

(57) ABSTRACT

The invention provides an evaluation method for creep property of LUHPC. It includes the following steps: S1, testing the compressive strength, elastic modulus, environmental temperature and humidity, and creep deformation variables of LUHPC prism samples; S2, based on the test data obtained in the step S1, calculating the initial creep coefficient of LUHPC at different ages and different steel fiber contents, and establishing a primary LUHPC creep model; S3, performing nonlinear regression analysis on the primary LUHPC creep model and fitting it by using the least squares method to establish a secondary LUHPC creep model regarding compressive strength and steel fiber content; S4, calculating a creep coefficient based on the secondary LUHPC creep model to evaluate the creep property of LUHPC. The creep model considers the influence of concrete compressive strength and steel fiber content, which makes the long-term performance analysis of LUHPC structures more reasonable and accurate.

9 Claims, 1 Drawing Sheet

EVALUATION METHOD FOR CREEP PROPERTY OF LUHPC

FIELD OF THE DISCLOSURE

The disclosure relates to the technical field of bridge and culvert engineering in the transportation industry, in particular to an evaluation method for creep property of LUHPC.

BACKGROUND

With the rapid development of urban elevated bridges and overpasses, prefabricated construction is increasingly being used in bridge engineering. The prefabricated construction technology in bridge construction will significantly shorten the construction period and reduce urban traffic congestion caused by the construction process. At the same time, it can reduce energy consumption and the impact on surrounding environmental pollution. The existing precast erection bridge components often use ordinary high-performance concrete, which has many problems such as high density, long time required for volume stability, steam curing and complex construction processes. This leads to the heavy weight of the precast components and difficulties in construction and transportation when applied to precast erection bridges. In addition, this also limits the development and promotion of prefabricated construction technology in bridge engineering.

In response to the above issues, lightweight ultra high performance concrete (LUHPC) is adopted, which has a light weight and excellent mechanical and durability properties. Its application in prefabricated bridge construction will significantly reduce the weight of the bridge, increase the span of the bridge, and thus solve the problems of component transportation and lifting with broad application prospects. Creep is an inherent characteristic of concrete that changes over time and has a significant impact on the long-term performance of concrete bridge structures. There are currently various types of concrete creep models, such as the CEB-FIP (1990) creep model, GL2000 creep model, Realm B3 creep model, and ACI 209R (1992) creep model. Due to the different basic forms, applicability, and consideration parameters of different creep models, there are significant differences in the long-term performance prediction results of concrete bridge structures by using different creep models. LUHPC is a new type of concrete material. The applicability of existing creep models for LUHPC is not clear, which limits its application in bridge structural engineering. Therefore, the present invention conducts research on the creep performance of LUHPC materials. The present invention considers the influence of parameters such as loading age and steel fiber content on the creep of concrete, and proposes a creep model suitable for LUHPC. This provides technical support for the application of LUHPC in bridge engineering.

SUMMARY

The present invention discloses an evaluation method for creep property of LUHPC for solving the problem of lacking an effective LUHPC creep model in the prior art.

To achieve the above technical objectives, the present invention provides an evaluation method for creep property of LUHPC. The evaluation method includes the following steps: S1, testing the compressive strength, elastic modulus, environmental temperature and humidity, and creep deformation variables of LUHPC prism samples; S2, based on the test data obtained in the step S1, calculating the initial creep coefficient of LUHPC at different ages and different steel fiber contents, and establishing a primary LUHPC creep model; S3, performing nonlinear regression analysis on the primary LUHPC creep model and fitting it by using the least squares method to establish a secondary LUHPC creep model regarding compressive strength and steel fiber content; S4, calculating a creep coefficient based on the secondary LUHPC creep model, and evaluating the creep property of lightweight ultra high performance concrete by the creep coefficient.

In the step S1, the compressive strength, elastic modulus, environmental temperature and humidity of LUHPC samples at different ages and steel fiber contents are obtained by tests of material mechanical properties.

In the step S1, obtaining creep coefficients of LUHPC samples at different ages by tests of LUHPC creep property.

In the step S2, the primary LUHPC creep model is established based on the CEB-FIP (1990) creep model, and its expression is as follows:

$$\varphi(t,t_0) = \varphi_0^{k_\beta} \beta_c(t-t_0)^{k_\alpha} \qquad (1)$$

In the above equation, $\varphi(t, t_0)$ represents the creep coefficient at loading age $t_0$ and calculation age $t$; $\varphi_0$ represents the nominal creep coefficient; $\beta_c(t-t_0)$ represents the development function of creep over time after loading; $k_\alpha$ is the influence coefficient of concrete compressive strength, and $k_\beta$ is the influence coefficient of steel fiber.

The specific process of the step S3 is as follows: S31, performing nonlinear regression analysis on the primary LUHPC creep model to obtain the compressive strength influence coefficient $k_\alpha$ and steel fiber influence coefficient KB corresponding to each set of creep coefficients; S32, using the least squares method for linear fitting to obtain expressions of the compressive strength influence coefficient $k_\alpha$ and steel fiber influence coefficient $k_\beta$, and bringing them into the primary LUHPC creep model to obtain the secondary LUHPC creep model.

The expression for the compressive strength influence coefficient $k_\alpha$ and steel fiber influence coefficient $k_\beta$ are as follows:

$$k_\alpha = 0.018 f_{co} \qquad (2)$$

$$k_\beta = 0.3 \qquad (3)$$

In the above equation, $f_{co}$ represents the axial compressive strength of LUHPC at the time of creep loading.

The expression for the secondary LUHPC creep model is as follows:

$$\varphi(t,t_0) = \varphi_0^{0.3} \beta_c(t-t_0)^{0.018 f_{co}} \qquad (4).$$

The expression for the nominal creep coefficient $\varphi_0$ is as follows:

$$\varphi_0 = \varphi_{RH} \cdot \frac{5.3}{(f_{cm}/f_{cm0})^{0.5}} \cdot \frac{1}{0.1 + (t_0/t_1)^{0.2}} \qquad (5)$$

In the above equation, $\varphi_{RH}$ represents the influence function of changes in relative humidity of the environment after loading; $t$ represents the concrete age at the calculation time, $t_1 = 1$ d; $f_{cm}$ represents the strength of concrete, $f_{cm} = 0.8 * f_{cu,k} + 8$ MPa.

The expression for the development function of creep over time after loading $\beta_c(t-t_0)$ is as follows:

$$\beta_c(t-t_0) = \left[\frac{(t-t_0)}{\beta_H + (t-t_0)}\right]^{0.3} \quad (6)$$

The expression for the influence function of changes in relative humidity of the environment after loading $\varphi_{RH}$ is as follows:

$$\varphi_{RH} = \frac{1 - RH/RH_0}{0.46(h/h_0)^{1/3}} \quad (7)$$

In the above equation, $\beta_H$ is the influence function of the theoretical thickness of the component after loading; RH represents the relative humidity of the environment, $RH_0 = 100\%$; h represents the theoretical thickness of the component, and $h_0 = 100$ mm.

The expression for the influence function of the theoretical thickness of the component after loading $\beta_H$ is as follows:

$$\beta_H = 150\left[1 + \left(1.2\frac{RH}{RH_0}\right)^{18}\right] \cdot \frac{h}{h_0} + 250 \quad (8)$$

In the above equation, RH represents the relative humidity of the environment, $RH_0 = 100\%$; h represents the theoretical thickness of the component, and $h_0 = 100$ mm.

The advantages of the present invention are as follows:

The present invention discloses an evaluation method for creep property of LUHPC. This method is based on the current CEB-FIP (1990) creep model, considering the effects of concrete compressive strength and steel fiber content, and proposes a calculation method for the creep model of lightweight ultra high performance concrete, which makes the long-term performance analysis of LUHPC structures more reasonable, accurate, and convenient. This evaluation method for creep property provides a calculation method for the long-term performance design of bridge structures, promotes the development of prefabricated concrete bridge structures, and also provides technical support for the promotion and application of lightweight ultra-high performance concrete materials in bridge structures and even building structural engineering.

BRIEF DESCRIPTION OF THE DRAWINGS

Accompanying drawings are for providing further understanding of embodiments of the disclosure. The drawings form a part of the disclosure and illustrate the principle of the embodiments of the disclosure along with the literal description. The drawings in the description below are merely some embodiments of the disclosure; a person skilled in the art can obtain other drawings according to these drawings without creative efforts. In the figures.

DETAILED DESCRIPTION OF PREFERRED EMBODIMENTS

The following will provide a clear and complete description of the technical solution in conjunction with examples of the present invention. Obviously, the described examples are only a portion of examples of the present invention, not all of them. Based on the examples in the present invention, all other examples obtained by ordinary technician in the art without creative labor fall within the scope of protection of the present invention.

Figure 1:
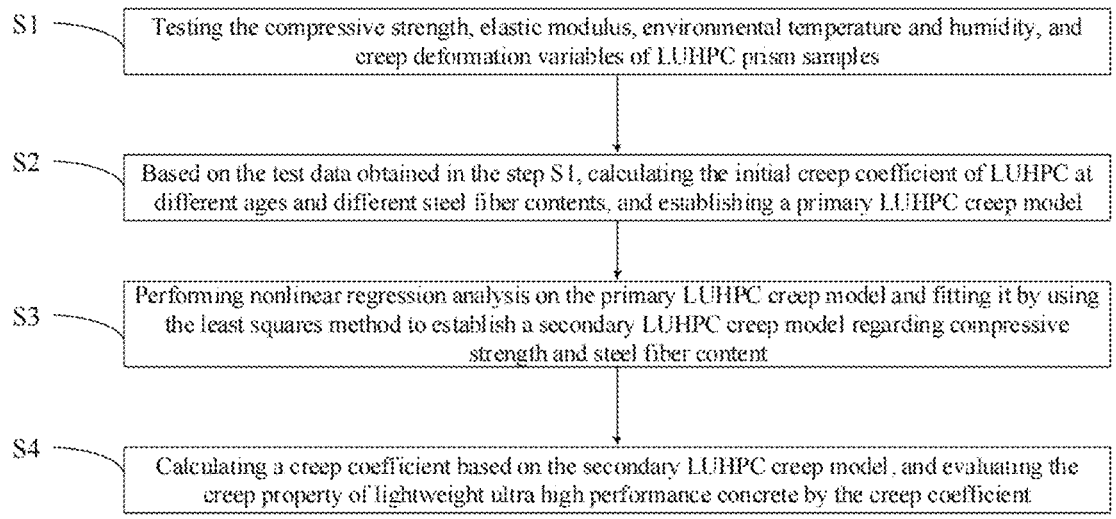
FIG. 1 is a process diagram of the evaluation method for creep property of LUHPC in the present invention.
Figure 2:
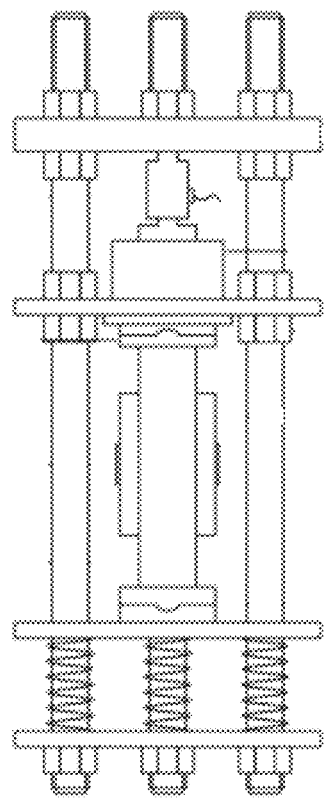
FIG. 2 is a device diagram for creep loading test of LUHPC prism in the present invention.

Refer to FIG. 1, the evaluation method for creep property of LUHPC includes the following steps:

S1, Testing the compressive strength, elastic modulus, environmental temperature and humidity, and creep deformation variables of LUHPC prism samples. In the step S1, the compressive strength, elastic modulus, environmental temperature and humidity of LUHPC samples at different ages and steel fiber contents are obtained by tests of material mechanical properties; obtaining creep coefficients of LUHPC samples at different ages by tests of LUHPC creep property. The specific device is similar to the traditional creep performance test device, as shown in FIG. 2, so it will not be elaborated further.

S2, Based on the test data obtained in the step S1, calculating the initial creep coefficient of LUHPC at different ages and different steel fiber contents, and establishing a primary LUHPC creep model. In the step S2, the primary LUHPC creep model is established based on the CEB-FIP (1990) creep model, and its expression is as follows:

$$\varphi(t,t_0) = \varphi_0^{k_\beta} \beta_c(t-t_0)^{k_\alpha} \quad (1)$$

In the equation (1), $\varphi(t, t_0)$ represents the creep coefficient at loading age $t_0$ and calculation age t; $\varphi_0$ represents the nominal creep coefficient; $\beta_c(t-t_0)$ represents the development function of creep over time after loading; $k_\alpha$ is the influence coefficient of concrete compressive strength, and $k_\beta$ is the influence coefficient of steel fiber.

The expression for the nominal creep coefficient $\varphi_0$ is as follows:

$$\varphi_0 = \varphi_{RH} \cdot \frac{5.3}{(f_{cm}/f_{cm0})^{0.5}} \cdot \frac{1}{0.1 + (t_0/t_1)^{0.2}} \quad (5)$$

In the above equation, $\varphi_{RH}$ represents the influence function of changes in relative humidity of the environment after loading; t represents the concrete age at the calculation time, $t_1 = 1$ d; $f_{cm}$ represents the strength of concrete, $f_{cm} = 0.8 \ast f_{cu,k} + 8$ MPa.

The expression for the development function of creep over time after loading $\beta_c(t-t_0)$ is as follows:

$$\beta_c(t-t_0) = \left[\frac{(t-t_0)}{\beta_H + (t-t_0)}\right]^{0.3} \quad (6)$$

The expression for the influence function of changes in relative humidity of the environment after loading $\varphi_{RH}$ is as follows:

$$\varphi_{RH} = \frac{1 - RH/RH_0}{0.46(h/h_0)^{1/3}} \quad (7)$$

In the equation (6) and (7), $\beta_H$ is the influence function of the theoretical thickness of the component after loading; RH represents the relative humidity of the environment, $RH_0 = 100\%$; h represents the theoretical thickness of the component, and $h_0 = 100$ mm.

The expression for the influence function of the theoretical thickness of the component after loading $\beta_H$ is as follows:

$$\beta_H = 150\left[1 + \left(1.2\frac{RH}{RH_0}\right)^{18}\right] \cdot \frac{h}{h_0} + 250 \quad (8)$$

In the equation (8), $\beta_H \leq 1500$.

S3, Performing nonlinear regression analysis on the primary LUHPC creep model and fitting it by using the least squares method to establish a secondary LUHPC creep model regarding compressive strength and steel fiber content. The specific process of the step S3 is as follows:

S31, Performing nonlinear regression analysis on the primary LUHPC creep model to obtain the compressive strength influence coefficient $k_\alpha$ and steel fiber influence coefficient $k_\beta$ corresponding to each set of creep coefficients.

S32, Using the least squares method for linear fitting to obtain expressions of the compressive strength influence coefficient $k_\alpha$ and steel fiber influence coefficient $k_\beta$, and bringing them into the primary LUHPC creep model to obtain the secondary LUHPC creep model. The expression for the compressive strength influence coefficient $k_\alpha$ and steel fiber influence coefficient $k_\beta$ are as follows:

$$k_\alpha = 0.018 f_{co} \quad (2)$$

$$k_\beta = 0.3 \quad (3)$$

In the equation (2) and (3), $f_{co}$ represents the axial compressive strength of LUHPC at the time of creep loading.

The expression for the secondary LUHPC creep model is as follows:

$$\varphi(t,t_0) = \varphi_0^{0.3} \beta_c (t-t_0)^{0.018 f_{co}} \quad (4)$$

The meaning of the parameters in the equation (4) is consistent with the previous equations (5) to (8).

S4, Calculating a creep coefficient based on the secondary LUHPC creep model, and evaluating the creep property of lightweight ultra high performance concrete by the creep coefficient. Due to the consideration of the influence of compressive strength and steel fiber content in the construction of the creep model, the present invention is more in line with the actual evaluation of LUHPC, thus enabling more accurate evaluation results of LUHPC creep performance.

The above evaluation method of the present invention will be described through specific examples, and the specific steps are as follows:

1) Test on the basic mechanical properties of LUHPC samples. Three samples with different steel fiber contents were selected for mechanical properties testing at 7 and 28 days of age. Test 6 sets of cube compressive strength, 6 sets of axial compressive strength, 6 sets of elastic modulus test, and 6 sets of flexural strength. The mechanical properties of specimens with different steel fiber contents and loading ages are detailed in Table 1.

Table 1 Selection of LUHPC samples and characterization of mechanical properties

| Steel fiber content/% | Age/d | Cube compressive strength/MPa | Axial compressive strength/MPa | Elastic modulus/MPa | bending strength/MPa |
|---|---|---|---|---|---|
| 2.0 | 7 | 102.63 | 93.31 | 32066.9 | 9.42 |
|  | 28 | 119.44 | 118.13 | 35092.0 | 10.94 |
| 2.5 | 7 | 105.80 | 102.25 | 34766.6 | 10.63 |
|  | 28 | 124.17 | 123.97 | 35969.1 | 12.01 |
| 3.0 | 7 | 108.74 | 107.62 | 34877.5 | 10.78 |
|  | 28 | 129.42 | 127.97 | 37308.6 | 13.46 |

Making 6 sets of LUHPC prism specimens, each consisting of 2-3 identical specimens. The parameters of all prism specimens are shown in Table 2, and the creep loading test is shown in FIG. 2. The creep coefficients of different specimens obtained from the experiment are shown in Table 3. The axial compressive strength of the prism with a loading stress of 0.4 times. Number description in Table 2-3: Taking C-07-2.0 as an example; C is the acronym for Creep, representing creep specimens; 07-2.0 indicates that the creep loading age of the specimen is 7 days, and the steel fiber content is 2.0%.

Table 2 List of parameters for prism specimens

| Number | Number of specimens | Steel fiber content/% | loading age/d | specimen size/mm |
|---|---|---|---|---|
| C-07-2.0 | 3 | 2.0 | 7 | 100 × 100 × 400 |
| C-28-2.0 | 2 | 2.0 | 28 | 100 × 100 × 400 |
| C-07-2.5 | 3 | 2.5 | 7 | 100 × 100 × 400 |
| C-28-2.5 | 2 | 2.5 | 28 | 100 × 100 × 400 |
| C-07-3.0 | 3 | 3.0 | 7 | 100 × 100 × 400 |
| C-28-3.0 | 2 | 3.0 | 28 | 100 × 100 × 400 |

Performing LUHPC prism creep tests to obtain the creep coefficients of LUHPC prism at various loading ages and steel fiber content, as shown in Table 3.

Table 3 Creep coefficients of prism specimens

| | creep coefficient | | | | | | | | | |
|---|---|---|---|---|---|---|---|---|---|---|
| Number | 1 d | 7 d | 14 d | 28 d | 60 d | 90 d | 120 d | 180 d | 270 d | 300 d |
| C-07-2.0 | 0.191 | 0.231 | 0.295 | 0.394 | 0.522 | 0.594 | 0.681 | 0.814 | 0.873 | 0.902 |
| C-28-2.0 | 0.044 | 0.119 | 0.169 | 0.238 | 0.369 | 0.469 | 0.567 | 0.665 | 0.703 | 0.731 |
| C-07-2.5 | 0.110 | 0.225 | 0.285 | 0.376 | 0.505 | 0.587 | 0.667 | 0.778 | 0.844 | 0.870 |
| C-28-2.5 | 0.057 | 0.124 | 0.174 | 0.239 | 0.340 | 0.437 | 0.532 | 0.627 | 0.653 | 0.677 |
| C-07-3.0 | 0.080 | 0.184 | 0.226 | 0.312 | 0.404 | 0.476 | 0.542 | 0.671 | 0.702 | 0.724 |
| C-28-3.0 | 0.055 | 0.127 | 0.171 | 0.235 | 0.328 | 0.413 | 0.495 | 0.582 | 0.602 | 0.622 |

2) Study the influence of steel fiber content and loading age on the creep coefficient of LUHPC. According to the theoretical regression analysis of the experimental values, the definition of creep coefficient is as follows:

$$\varphi(t,\tau) = \frac{\varepsilon_c(t,\tau)}{\varepsilon_c(\tau)} \qquad (9)$$

In the equation (9), $\varepsilon_c(t, \tau)$ is creep strain at the time t, and $\varepsilon_c(\tau)$ is elastic strain at the time $\tau$.

For axial compression specimens, the primary LUHPC creep model is established based on the CEB-FIP (1990) creep model, and its expression is as follows:

$$\varphi(t,t_0) = \varphi_0^{k_\beta} \beta_c(t-t_0)^{k_\alpha} \qquad (1)$$

In the equation (1), $\varphi(t, t_0)$ represents the creep coefficient at loading age $t_0$ and calculation age t; $\varphi_0$ represents the nominal creep coefficient; $\beta_c(t-t_0)$ represents the development function of creep over time after loading; $k_\alpha$ is the influence coefficient of concrete compressive strength, and $k_\beta$ is the influence coefficient of steel fiber.

3) Obtaining the creep coefficient of each LUHPC prism specimen based on the creep tests, and using the least squares method to perform nonlinear regression analysis on the creep coefficient of lightweight ultra high performance concrete to obtain expressions of the compressive strength influence coefficient $k_\alpha$ and steel fiber influence coefficient $k_\beta$. The expression are as follows:

$$k_\alpha = 0.018 f_{co} \qquad (2)$$

$$k_\beta = 0.3 \qquad (3)$$

In the equation (2) and (3), $f_{co}$ represents the axial compressive strength of LUHPC at the time of creep loading.

According to formulas (1), (2), and (3), the expression for the creep coefficient of lightweight ultra high performance concrete is obtained as follows:

$$\varphi(t,t_0) = \varphi_0^{0.3} \beta_c(t-t_0)^{0.018 f_{co}} \qquad (4).$$

Substituting the nominal creep coefficient $\varphi_0$, the development coefficient of creep over time after loading $\beta_c(t-t_0)$, the calculation time t, the loading age $t_0$, and the axial compressive strength $f_{co}$ of concrete at the loading age $t_0$ into the equation (7) for the creep coefficient of lightweight ultra high performance concrete to obtain the creep coefficient of lightweight ultra high performance concrete.

Example 1

In example 1, the cross-section of the LUHPC prism is 100 mm×100 mm, and the height of the LUHPC prism is h=400 mm. By using the method, the axial compressive strength $f_{co}$ at the time of loading is 93.31 Mpa. The nominal creep coefficient $\varphi_0$ is 2.28, and the development coefficient of creep over time $\beta_c(t-t_0)$ is 0.802.

According to equation (2), the influence coefficient of LUHPC compressive strength $k_\alpha$ can be calculated as 1.68 by using the aforementioned steps. According to equation (4), the creep coefficient of lightweight ultra-high performance concrete for 300 d is 0.885, which is highly consistent with the experimental values. It can be seen that the accuracy of the LUHPC creep model is high.

Example 2

In example 2, the cross-section of the LUHPC prism is 100 mm×100 mm, and the height of the LUHPC prism is h=400 mm. By using the method, the axial compressive strength $f_{co}$ at the time of loading is 102.25 Mpa. The nominal creep coefficient $\varphi_0$ is 2.24, and the development coefficient of creep over time $\beta_c(t-t_0)$ is 0.802.

According to equation (2), the influence coefficient of LUHPC compressive strength $k_\alpha$ can be calculated as 1.841 by using the aforementioned steps. According to equation (4), the creep coefficient of lightweight ultra-high performance concrete for 300 d is 0.849, which is highly consistent with the experimental values. It can be seen that the accuracy of the LUHPC creep model is high.

Different from existing technologies, the present invention provides an evaluation method for creep property of LUHPC. This method is based on the current CEB-FIP (1990) creep model, considering the effects of concrete compressive strength and steel fiber content, and proposes a calculation method for the creep model of lightweight ultra high performance concrete, which makes the long-term performance analysis of LUHPC structures more reasonable, accurate, and convenient. This evaluation method for creep property provides a calculation method for the long-term performance design of bridge structures, promotes the development of prefabricated concrete bridge structures, and also provides technical support for the promotion and application of lightweight ultra-high performance concrete materials in bridge structures and even building structural engineering.

The above descriptions are only preferred examples of the present invention and are not intended to limit the present invention. Any modification, equivalent replacement, improvement, etc., made within the spirit and principle of the present invention shall be included in the protection of the present invention.

What is claimed is:

1. An evaluation method for creep property of LUHPC, including the following steps:

S1, testing compressive strength, elastic modulus, environmental temperature and humidity, and creep deformation variables of LUHPC prism samples;

S2, based on test data obtained in the step S1, calculating first creep coefficients of LUHPC at different ages and different steel fiber contents, and establishing a primary LUHPC creep model;

S3, performing nonlinear regression analysis on the primary LUHPC creep model and fitting it by using a least squares method to establish a secondary LUHPC creep model regarding the compressive strength and the steel fiber content;

S4, calculating a second creep coefficient based on the secondary LUHPC creep model, and evaluating a creep property of lightweight ultra high performance concrete by the second creep coefficient;

in the step S2, the primary LUHPC creep model is established based on CEB-FIP (1990) creep model, and its expression is as follows:

$$\varphi(t,t_0) = \varphi_0^{k_\beta} \beta_c(t-t_0)^{k_\alpha};$$

in the above equation, $\varphi(t, t_0)$ represents the first creep coefficient at loading age $t_0$ and calculation age t; $\varphi_0$ represents a nominal creep coefficient; $\beta_c(t-t_0)$ represents a development function of creep over time after loading; $k_\alpha$ is an influence coefficient of concrete compressive strength, and $k_\beta$ is an influence coefficient of steel fiber.

2. The evaluation method for creep property of LUHPC according to claim 1, in the step S1, compressive strength, elastic modulus, environmental temperature and humidity of LUHPC samples at different ages and steel fiber contents are obtained by tests of material mechanical properties.

3. The evaluation method for creep property of LUHPC according to claim 1, in the step S2, obtaining the first creep coefficients of LUHPC samples at different ages by tests of LUHPC creep property.

4. The evaluation method for creep property of LUHPC according to claim 1, the specific process of the step S3 is as follows:

S31, performing nonlinear regression analysis on the primary LUHPC creep model to obtain the influence coefficient of concrete compressive strength $k_\alpha$ and the influence coefficient of steel fiber $k_\beta$ corresponding to each set of the second creep coefficients;

S32, using the least squares method for linear fitting to obtain expressions of the influence coefficient of concrete compressive strength $k_\alpha$ and the influence coefficient of steel fiber $k_\beta$, and bringing them into the primary LUHPC creep model to obtain the secondary LUHPC creep model.

5. The evaluation method for creep property of LUHPC according to claim 4, the expression for the influence coefficient of concrete compressive strength $k_\alpha$ and the influence coefficient of steel fiber $k_\beta$ are as follows:

$k_\alpha = 0.018 f_{co}$;

$k_\beta = 0.3$;

in the above equation, $f_{co}$ represents an axial compressive strength of LUHPC at the time of creep loading.

6. The evaluation method for creep property of LUHPC according to claim 5, the expression for the secondary LUHPC creep model is as follows:

$\varphi(t,t_0) = \varphi_0^{0.3} \beta_c(t-t_0)^{0.018 f_{co}}$.

7. The evaluation method for creep property of LUHPC according to claim 6, the expression for the nominal creep coefficient $\varphi_0$ is as follows:

$$\varphi_0 = \varphi_{RH} \cdot \frac{5.3}{(f_{cm}/f_{cm0})^{0.5}} \cdot \frac{1}{0.1 + (t_0/t_1)^{0.2}};$$

in the above equation, $\varphi_{RH}$ represents an influence function of changes in relative humidity of the environment after loading; t represents a concrete age at the calculation time, $t_1 = 1$ d; $f_{cm}$ represents a strength of concrete, $f_{cm} = 0.8 * f_{cu,k} + 8$ MPa.

8. The evaluation method for creep property of LUHPC according to claim 7, the expression for the development function of creep over time after loading $\beta_c(t-t_0)$ is as follows:

$$\beta_c(t-t_0) = \left[\frac{(t-t_0)}{\beta_H + (t-t_0)}\right]^{0.3};$$

the expression for the influence function of changes in relative humidity of the environment after loading $\varphi_{RH}$ is as follows:

$$\varphi_{RH} = \frac{1 - RH/RH_0}{0.46(h/h_0)^{1/3}};$$

in the above equation, $\beta_H$ represents an influence function of the theoretical thickness of the component after loading; RH represents a relative humidity of the environment, $RH_0 = 100\%$; h represents a theoretical thickness of the component, and $h_0 = 100$ mm.

9. The evaluation method for creep property of LUHPC according to claim 8, the expression for the influence function of the theoretical thickness of the component after loading $\beta_H$ is as follows:

$$\beta_H = 150\left[1 + \left(1.2\frac{RH}{RH_0}\right)^{18}\right] \cdot \frac{h}{h_0} + 250.$$

\* \* \* \* \*